Figure 2:
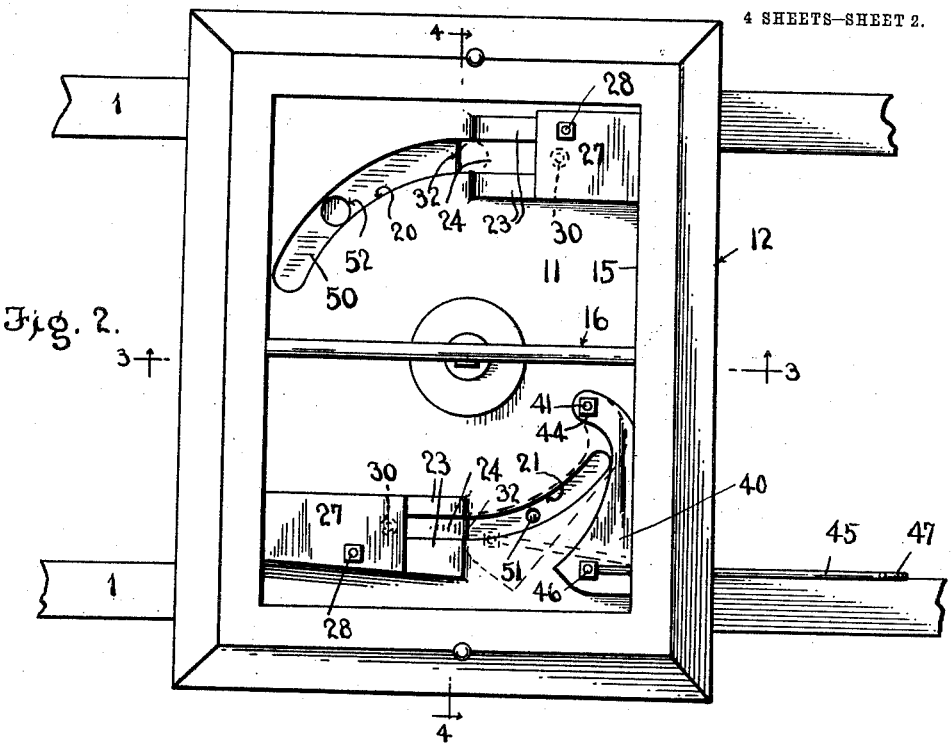

G. E. WATSON.
CORN AND PEA PLANTER.
APPLICATION FILED AUG. 5, 1912.
1,078,395.
Patented Nov. 11, 1913.
4 SHEETS—SHEET 1.
Fig. 1.
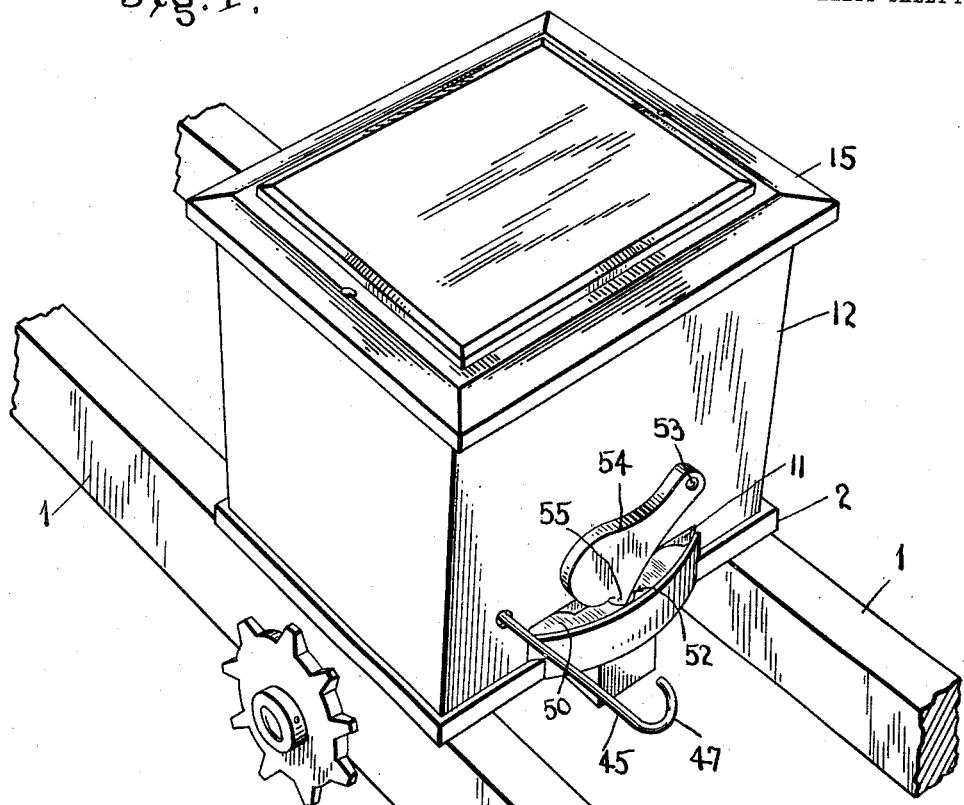
Fig. 11.
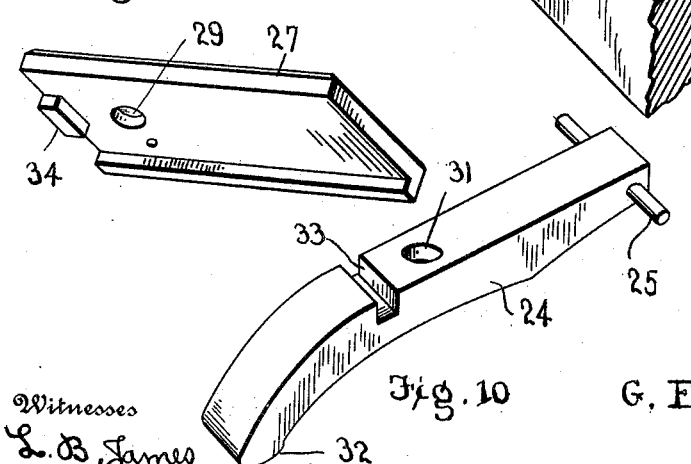
Fig. 10
Fig. 12.
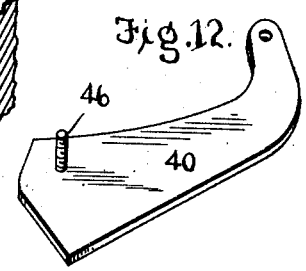
Witnesses
L. B. James
N. L. Collamer
Inventor
G. E. Watson
By H. B. Willson &co
Attorneys

G. E. WATSON.
CORN AND PEA PLANTER.
APPLICATION FILED AUG. 5, 1912.

1,078,395.

Patented Nov. 11, 1913.

4 SHEETS—SHEET 2.

Witnesses
L. B. James
N. L. Collamer

Inventor
G. E. Watson
By H. B. Wilson &Co.
Attorneys

G. E. WATSON.
CORN AND PEA PLANTER.
APPLICATION FILED AUG. 5, 1912.
1,078,395.
Patented Nov. 11, 1913.
4 SHEETS—SHEET 3.
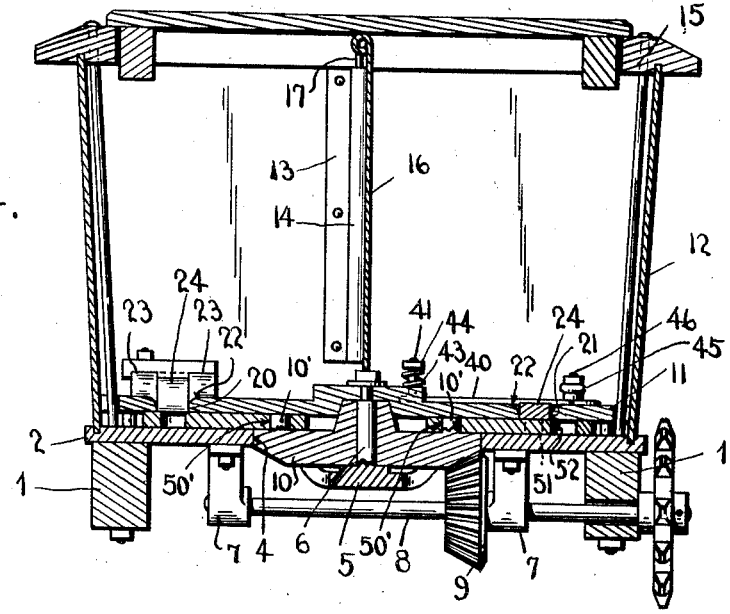
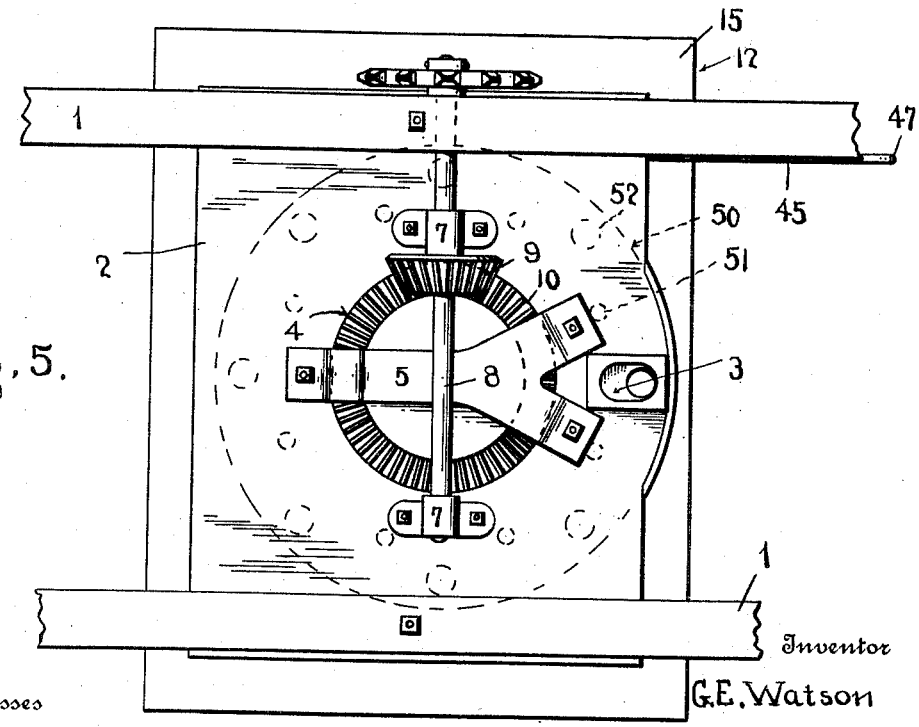
Witnesses
L. B. James
N. L. Collamer
Inventor
G. E. Watson
By H. B. Willson & Co.
Attorneys G. E. WATSON.
CORN AND PEA PLANTER.
APPLICATION FILED AUG. 5, 1912.
1,078,395.
Patented Nov. 11, 1913.
4 SHEETS—SHEET 4.
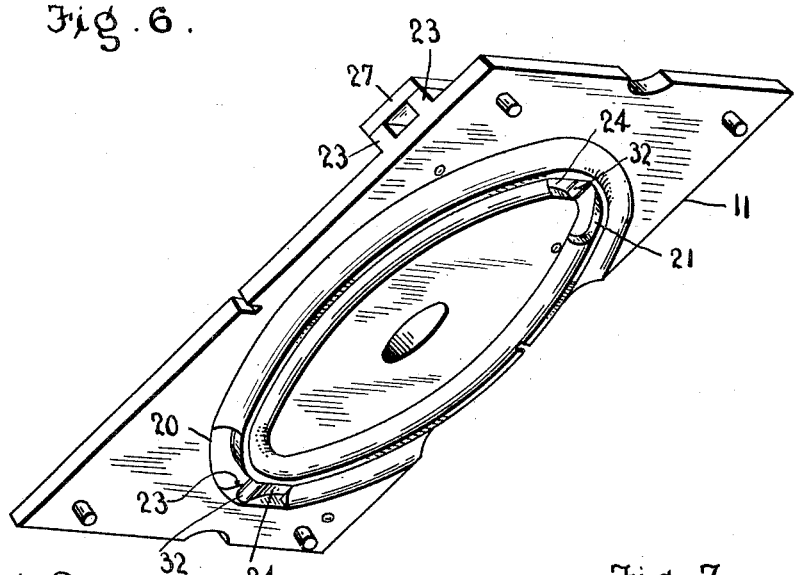
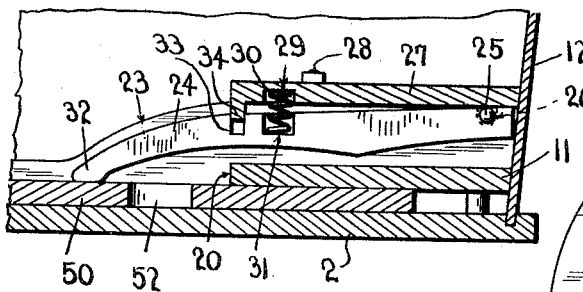
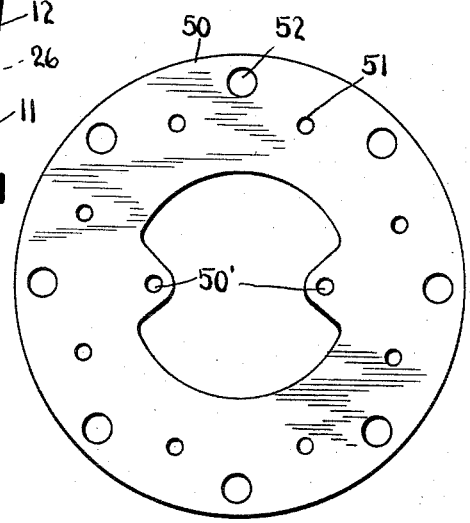
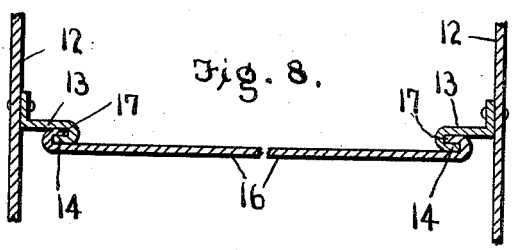
Witnesses
L. B. James
N. L. Coolamer
Inventor
G. E. Watson
By H. B. Willson &co
Attorneys

UNITED STATES PATENT OFFICE.

GEORGE E. WATSON, OF HICKORY POINT, TENNESSEE.

CORN AND PEA PLANTER.

1,078,395. Specification of Letters Patent. Patented Nov. 11, 1913.

Application filed August 5, 1912. Serial No. 713,441.

*To all whom it may concern:*

Be it known that I, GEORGE E. WATSON, a citizen of the United States, residing at Hickory Point, in the county of Montgomery and State of Tennessee, have invented certain new and useful Improvements in Corn and Pea Planters; and I do declare the following to be a full, clear, and exact description of the invention, such as will enable others skilled in the art to which it appertains to make and use the same.

This invention relates to corn planters, and more especially to those of that type that are adapted for planting a smaller seed along with the corn, such as peas, beans, and the like; and the object of the same is to construct the device in such manner that the dropping of the smaller seeds may be cut off while the planting of the corn is continued.

A further object is to make certain improvements in the details of construction throughout the entire machine, and this with other objects is carried out by building it in the manner hereinafter more fully described and claimed, and as shown in the drawings, wherein—

Figure 3:
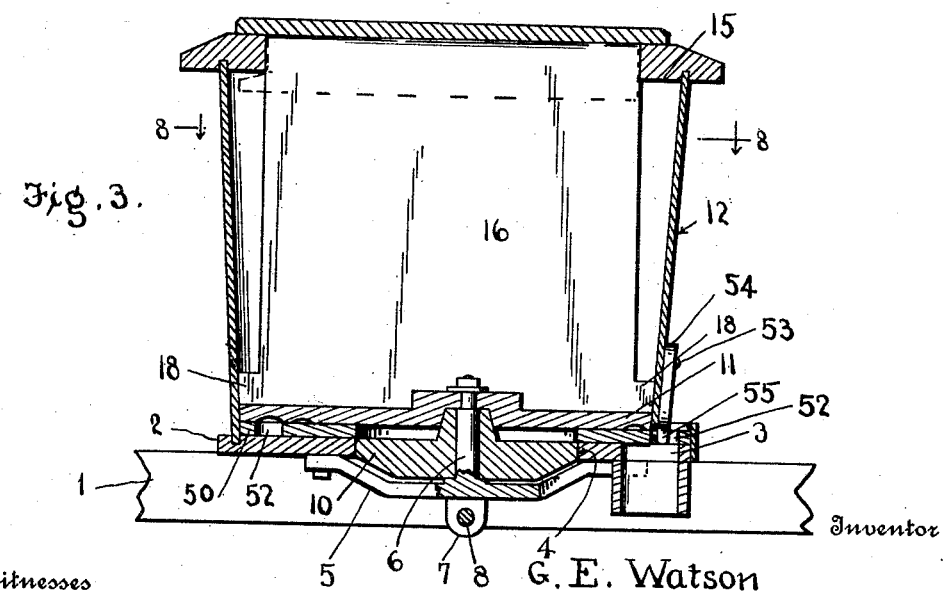

Figure 1 is a perspective view of this device complete, Fig. 2 a plan view thereof, Figs. 3 and 4 are cross sections on the lines 3—3 and 4—4 respectively of Fig. 2, Fig. 5 a bottom plan view of the device; Fig. 6 is a perspective view of the false bottom removed from the hopper and elevated so that the channels in its lower face may be seen; Fig. 7 is a plan view of the seed dropping plates; Fig. 8 is a cross section on line 8—8 of Fig. 3; Fig. 9 is an enlarged sectional detail of one of the spring-pressed fingers, Fig. 10 a perspective detail of the finger or ejector; Fig. 11 a similar detail of the cover plate for the finger-chamber; Fig. 12 is a perspective detail of the cut-off plate.

Mounted on parallel sills 1 is the bottom 2 of the feed box or hopper 12, which bottom has an outlet opening 3 leading to the drill not necessary to illustrate and a central round opening 4 of considerable size spanned by a spider 5 having a pin or journal 6 rising through the center of the opening. The bottom also carries bearings 7 for a cross shaft 8 driven from any suitable source of power and having a gear pinion 9. In the present construction the latter meshes with a gear wheel 10 standing in said opening 4 with its hub journaled on said pin 6 and rotating in a horizontal plane below the false bottom 11 of the seed box 12. The latter may be of any suitable construction, but by preference it has internal guides 13 at opposite sides having upright reversely bent flanges 14 along the inner edges, the flanges being parallel whether the walls of the box 12 are parallel or not, and the upper edges of said walls are closed by a beading 15 overhanging said walls on the interior for a purpose to appear. A partition 16 is provided (preferably of sheet metal) having inturned flanges 17 along its side edges adapted to engage those numbered 14 on the guides 13, and hooks 18 at its lower corners projecting outward and adapted to engage beneath the beading 15 around the top of the seed box so as to prevent the partition from being accidentally withdrawn completely from place. The side flanges 17 terminate above said hooks, and it follows that when the partition is drawn upward until the hooks engage under the beading, the flanges 14 are drawn out of engagement with the flanges 17 and the entire partition can be moved laterally so as to disengage the flanges from each other, then turn the partition within the box, and remove it entirely. Therefore when it becomes necessary to withdraw the partition it can be done, but ordinarily the partition is raised only part way as when access is to be had to the mechanism on the interior, and unless the partition is raised the full height it cannot be disconnected from the guide.

The false bottom 11 is provided with two arcuate slots 20 and 21, the former a little wider than the latter and a little more remote from the center of the bottom, but otherwise these slots are duplicates of each other and a description of one will suffice for both. Each slot occupies about one-quarter of a circle and stands to one side of the transverse center of the seed box which is ordinarily occupied by the partition, and the side and inlet end of said slot are beveled as shown at 22. Rising from the false bottom beyond the outlet end of the slot are parallel ribs 23 which, with that portion of the false bottom between them, forms a channel in whose end is located a finger 24 having a cross pin 25 at its rear end lying in notches 26 in said ribs and held therein by a cover plate 27 which normally closes the recess between the ribs and is held in place by a bolt or screw 28. In the lower side of the plate 27 is a socket 29 receiving the upper end of a short spiral spring 30, the lower end of the same resting in a socket 31 in the upper side of the finger 24, and by this means the tip 32 of said finger is borne normally downward as the whole finger swings around the pivot formed by its cross pin 25 within the notches 26. The finger may be provided with a cross groove 33 engaged by a depending lip 34 on the lower side of the cover plate 27, and when the latter is removed the lip is lifted off with it, and the finger can be lifted out of the recess between the two ribs 23 for cleaning or repair. The tip 32 of this finger extends into the slot 20 at its rear end, and serves a function hereinafter described; and the arrangement of the spring permits said tip to rise when an obstruction occurs, and therefore prevents the rupture of parts. As above suggested, the seed box is divided by the partition into two compartments, one for corn and the other for smaller seed, and each compartment has its outlet slot and a finger of the character just described, the slots and the fingers being of different widths so that one may well accommodate the ordinary feeding corn and the other may well accommodate peas or whatever smaller seed is to be planted.

A cut of plate 40 is pivoted at 41 on an upright screw rising from the bottom 11 within the seed compartment, and preferably depressed into frictional contact with said bottom by means of an expansive spring 43 under the head 44 of said screws, and a rod 45 pivoted at 46 to the plate leads to one side wall of the seed box and has a handle 47 at its outer end. When this handle is pushed inward the cut off plate is turned on its pivot and thrown over the slot 21 so that no more seed will be dropped although the motion of the machine is continued; and when the handle is drawn in the opposite direction the cut off plate is removed from above the slot 21 and the dropping of the seed continues. It is obvious that a similar plate may be used on the corn side of the device, but as ordinarily I prefer to continue dropping the seeding corn whether the other seed be dropped or not, this is not shown and will generally not be employed.

The seeding plate 50 is a disk having eyes 50' engaging pins 10' rising from the gear 10 so that the disk shall stand between the true and false bottoms of the seed box 12. It has through it a ring of small-sized openings 51 disposed just that distance from its center as will cause them to travel beneath the smaller slots 21, and a second ring of large-sized openings 52 just that distance from the center as will cause them to travel beneath the corn-slot 20. To the outside of the seed box at a suitable point is pivoted at 53 a hammer or ejector 54 whose nose 55 depends in proper position to drop into the larger holes 52 in this plate, so that as it revolves and carries the corn with it, the kernels will be forcibly ejected by said hammer through the outlet 3, and then through the drill or other tube not shown by means of which they are conveyed to the ground.

The operation of my machine will now be understood. Power is applied to the driving shaft and through the gear pinion and gear to the seeding plate, and its rows of holes pass under the slots 20 and 21. If that side of the seed box to the right of the partition is filled with corn and the other side with a smaller seed such as peas, the corn will drop into the slot 20 and will be taken up by the holes in the seed plate and carried around within said slot under the tip of its finger, and thence around under the nose of the hammer and dropped through the outlet 3, and meanwhile (if the cut off plate is retracted as seen in Fig. 2) the peas will drop through the slot 21 into the smaller holes 51 in the seed plate and be carried around and dropped also through the outlet 3 and sowed along with the corn. If two small-sized seeds (either kernels of corn or peas) should drop into one hole, it is the purpose of the tip 32 of the finger to push one out of place; but if they should become wedged in the hole or some obstruction should fall into the hole and seek to pass under the tip of the finger, the latter will not be broken because it can yield as above described. From time to time the seed in the two compartments of the seed box are replenished as will be clear. When the operator decides to cease dropping peas or smaller seeds, he pushes in the handle controlling the cut off plate, and the dropping of the corn will continue. When he desires to cease dropping corn, the clutch connection between the shaft herein shown and the power shaft of the feeder will be actuated as well understood, but I have not illustrated this detail as it forms no part of the present invention.

The parts are of the desired sizes, shapes, proportions and materials; and changes in details may be made as long as they do not depart from the gist of the idea.

What is claimed as new is:—

1. In a seed dropper, the combination with the seed-dropping plate having a circular series of openings, the seed box having an outlet through its bottom over which said openings pass and a false bottom overlying the plate and having an arcuate slot under which said openings pass, and means for rotating the plate; of spaced ribs on the false bottom at the outlet end of said slot having alined notches in their upper edges, a finger lying between said ribs and having a cross pin pivotally mounted in said notches and a transverse notch in its upper edge near its free end, a cover plate secured across the rib and having a depending lip adapted to engage the notch in said finger, the plate closing the notches in said rib, and an expansive spring between said plate and finger and throwing the tip of the latter through said arcuate slot and into contact with the seed plate.

2. In a seed dropper, the combination with the seed-dropping plate having a circular series of openings, the seed box having an outlet through its bottom over which said openings are adapted to pass, and means for rotating said plate; of a false bottom within the box overlying the plate and having an arcuate slot under which said openings pass, ribs rising from the false bottom at the outlet end of said slot and producing a channel between them, a finger pivoted between said ribs and having a transverse notch and a socket in its upper face, a cover plate secured across the ribs and having a socket in its lower face above that in the finger, an expansive spring whose extremities are mounted in said sockets, and a lip depending from the cover plate and engaging the transverse notch in the finger, the inner end of the latter being formed into a tip projecting normally through said slot and into contact with the seed plate.

In testimony whereof I have hereunto set my hand in presence of two subscribing witnesses.

GEORGE E. WATSON.

Witnesses:
W. L. MACON,
J. L. ADKINS.

---

Copies of this patent may be obtained for five cents each, by addressing the "Commissioner of Patents, Washington, D. C."